No. 633,262. Patented Sept. 19, 1899.
M. L. COWAN.
MILK COOLER.
(Application filed Mar. 1, 1899.)
(No Model.)
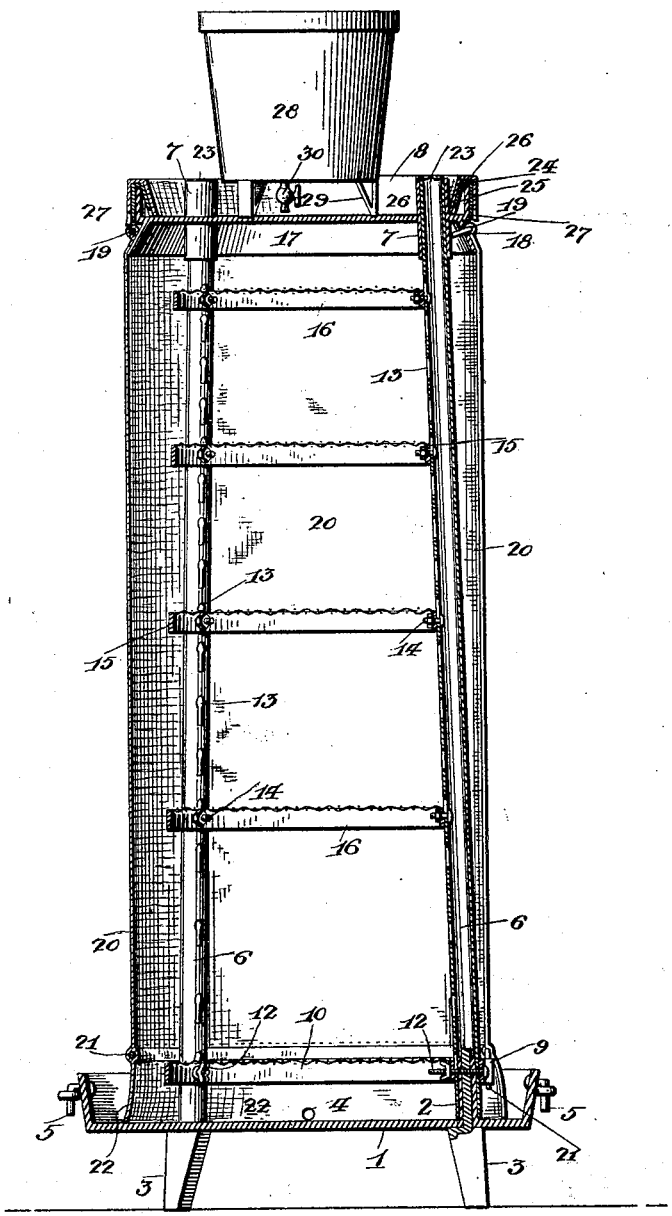
Mark L. Cowan, Inventor
Witnesses
by H. B. Willson & Co.,
Attorneys
THE NORRIS PETERS CO., PHOTO-LITHO., WASHINGTON, D. C.

UNITED STATES PATENT OFFICE.

MARK L. COWAN, OF EDDY, TEXAS.

MILK-COOLER.

SPECIFICATION forming part of Letters Patent No. 633,262, dated September 19, 1899.

Application filed March 1, 1899. Serial No. 707,363. (No model.)

*To all whom it may concern:*

Be it known that I, MARK L. COWAN, a citizen of the United States, residing at Eddy, in the county of McLennan and State of Texas, have invented certain new and useful Improvements in Milk-Coolers; and I do declare the following to be a full, clear, and exact description of the invention, such as will enable others skilled in the art to which it appertains to make and use the same.

My invention relates to improvements in milk-coolers, and more particularly to that class of combined coolers and aerators in which the evaporation of water is employed in lieu of ice; and the object is to provide a simple, inexpensive, and effective device of this character.

To these ends the invention consists in the construction, combination, and arrangement of the device, as will be hereinafter more fully described, and particularly pointed out in the appended claim.

It is a well-known fact that fresh milk contains animal heat; also, that in the subsequent changes milk undergoes there are gases being constantly thrown off and that in order to free it from this heat and gas the milk should be kept in open vessels; also, that milk and butter are exceedingly susceptible of and quickly contaminated by other odoriferous substances or gases. It is also well known that in warm dry weather by placing in a current of air a vessel surrounded by a wet cloth the evaporation of the water in the cloth causes the contents of the vessel to become very much cooler than the surrounding atmosphere. I attain these objects by constructing at a very small cost a cool, clean, airy, and convenient receptacle or repository for the uncovered milk vessels, whereby the milk and butter may be freed from the odors and gases and kept pure, cool, and healthful in the following manner: First, having an adjustable repository made of a material that is not susceptible of absorbing and does not contain, emit, or reflect gases or odors, the repository to be sufficiently closed to exclude dust and insects; second, having a means of aerifying the water, thereby cooling and freeing the water from any unhealthy or unpleasant odors before passing to evaporation or coming in proximity to the milk vessels; third, having the most perfect means to control and regulate the distribution of water, so as to obtain the greatest amount of evaporation, hence securing the lowest temperature in repository; fourth, having a cooler that will occupy a small space; fifth, having a cooler that is convenient and easy of access; sixth, having a cooler that can be quickly and easily separated in parts and packed in small space for transportation or storage, and, seventh, having a cooler that is durable and can be constructed at small cost.

In the accompanying drawing the same reference characters indicate the same parts of the invention.

The figure in the drawing is a vertical section of a cooler embodying my invention.

In said drawing, 1 denotes the base-pan, which is provided with the tubular sockets 2 2 to receive the shouldered legs 3 3. This base-pan is provided with a stoppered outlet 4 and pivoted hooks 5 5 for conveniently securing the device to a fixture or other suitable support to support it in an upright position and prevent its being accidentally overturned.

6 6 denote converging tubular standards encompassing the upper ends of the sockets 2, and their upper ends are seated in the sleeves 7 7, which are fixed in and extend through the water-pan 8.

9 9 denote brackets secured to the lower ends of the standard 6, and 10 denotes a reticulated shelf, also secured to the lower ends of the standards at a suitable distance above the bottom of the base-pan by the bolts 12 12, and it will be noted that these bolts pass through the flange of the shelf, the standard, the pan-socket, the stem or post of the leg, and the bracket 9 to detachably secure all of these parts together.

The standards are provided with a series of vertically and horizontally alined slots 13 13 to receive the heads of the screw-bolts 14 14, which project through the annular flanges 15 15 of the horizontal series of adjustable reticulated shelves 16 16, which may be thus adjustably spaced apart to conform to the milk-receptacles.

The bottom of the water-pan 8 is provided with an annular flaring hood 17, which is provided with retaining-orifices 18 18 to receive the bent ends of the spring-wire frame 19, which encompasses the flaring hood and supports the curtain 20, the lower end of which is adjustably secured to a correspondingly-formed spring-wire frame 21, the bent ends of which are removably secured in the brackets 9 on the lower ends of the standards, and the lower end of the curtain 20 terminates in a skirt 22, which reaches to the bottom of the base-pan. This curtain completely incloses the standards, shelves, and the space between the upper and lower pans, and consequently the milk, butter, or other articles placed upon the shelves.

The upper ends of the sleeves 7 7 are protected by wire-gauze caps 23, which prevent the entrance of insects or foreign matter and at the same time permit the free circulation of air through the tubular standards.

24 denotes an inverted-V-shaped collar which encompasses the flange of the water-pan 8, its inner flange 25 being serrated and extending downward to about the bottom of the inside of the water-pan, while its outer flange projects over and encompasses the upper edge of the curtain.

26 denotes a capillary fabric which snugly encompasses the collar, and its inner edge likewise projects into the water-pan, while its outer edge terminates in a series of scallops or serrations 27 27, which extend below the outer flange of the collar and terminate at a point above the curtain.

28 denotes a water-reservoir provided with a cover to prevent evaporation and contamination by foreign matter and supported by suitable legs 29 29 in the water-pan 8. This reservoir is also provided with a drip-cock 30 to regulate the supply of water to the pan 8.

The operation is as follows: The articles to be cooled are placed upon the reticulated shelves and the curtain drawn to completely envelop them, the water-reservoir is filled with water and a quantity is also placed in the water-pan into which the inner edge of the capillary fabric extends, and the drip-cock regulated to provide a continuous supply of water to the pan to replenish that exhausted by capillary action and evaporation. The water being drawn from the pan by capillary action through the medium of the fabric is discharged by gravity on the curtain, which it saturates, and the evaporation taking place carries off the animal heat from the milk, and thus lowers its temperature, and the circulation of air consequent upon the evaporation also carries off the animal odors emanating from the milk, thus tending to aerate and purify it at the same time.

The device is extremely simple, and consequently inexpensive. It is also conveniently portable while in actual use, and when desired may be readily taken apart and packed in a small space for storage or transportation. The metal part is made of galvanized iron and can be readily kept sweet and clean, so as not to contaminate the contents of the cooler.

It will of course be understood that various changes in the form, proportion, and the minor details of construction may be resorted to without departing from the principle or sacrificing any of the advantages of my invention.

Having thus described the invention; what is claimed, and desired to be secured by Letters Patent of the United States, is—

A cooler of the class described comprising the base-pan, the tubular standards, the reticulated shelves adjustably secured to said standards, the superimposed water-pan and water-reservoir, the capillary fabric formed with a serrated edge, and the curtain encompassing said standards, substantially as and for the purpose set forth.

In testimony whereof I have hereunto set my hand in presence of two subscribing witnesses.

MARK L. COWAN.

Witnesses:
R. HAYNE KING,
CLYDE BURNS.